United States Patent
Li et al.

(10) Patent No.: US 12,497,813 B2
(45) Date of Patent: Dec. 16, 2025

(54) PROTECTIVE APPARATUS AND AERIAL WORK DEVICE

(71) Applicant: HUNAN SINOBOOM INTELLIGENT EQUIPMENT CO., LTD, Hunan (CN)

(72) Inventors: Xiping Li, Hunan (CN); Guoliang Liu, Hunan (CN); Jiping Zheng, Hunan (CN)

(73) Assignee: Hunan Sinoboom Intelligent Equipment Co., Ltd, Changsha (CN)

( * ) Notice: Subject to any disclaimer, the term of this patent is extended or adjusted under 35 U.S.C. 154(b) by 372 days.

(21) Appl. No.: 18/265,243

(22) PCT Filed: Dec. 3, 2021

(86) PCT No.: PCT/CN2021/135277
§ 371 (c)(1),
(2) Date: Jun. 2, 2023

(87) PCT Pub. No.: WO2022/121791
PCT Pub. Date: Jun. 16, 2022

(65) Prior Publication Data
US 2024/0003177 A1 Jan. 4, 2024

(30) Foreign Application Priority Data
Dec. 8, 2020 (CN) .................. 202011423985.0

(51) Int. Cl.
*F41H 5/06* (2006.01)
*E05F 11/04* (2006.01)
*F41H 5/22* (2006.01)

(52) U.S. Cl.
CPC ............. *E05F 11/04* (2013.01); *F41H 5/06* (2013.01); *F41H 5/22* (2013.01); *E05Y 2999/00* (2024.05)

(58) Field of Classification Search
CPC ..... F41H 5/06; F41H 5/22; F41H 5/24; F41H 5/08; F41H 5/226
See application file for complete search history.

(56) References Cited

U.S. PATENT DOCUMENTS

| | | | |
|---|---|---|---|
| 6,709,049 B2* | 3/2004 | Funahashi | B60J 7/0573 296/223 |
| 9,702,665 B1* | 7/2017 | Rose, Jr. | E06B 9/13 |
| 2009/0100999 A1* | 4/2009 | Marqueling | F41H 5/226 89/36.08 |

FOREIGN PATENT DOCUMENTS

| | | |
|---|---|---|
| CN | 202831968 U | 3/2013 |
| CN | 210195797 U | 3/2020 |

(Continued)

OTHER PUBLICATIONS

International Search Report and Written Opinion, dated Feb. 28, 2022, for International Application No. PCT/CN2021/135277, 7 pages.

*Primary Examiner* — J. Woodrow Eldred
(74) *Attorney, Agent, or Firm* — MASCHOFF BRENNAN; Michael Mauriel

(57) ABSTRACT

A protective apparatus and an aerial work device are disclosed. The protective apparatus comprises a bracket (1) and a cover (2); the upper side of the cover (2) is hinged to the upper side of the bracket (1); the protective apparatus further comprises a pull-down apparatus (4); the pull-down apparatus (4) comprises a fixed pulley (403), a movable pulley (404), a push rod (407) and a pull rope (401); the fixed pulley (403) is fixedly connected to the cover (2); the movable pulley (404) is located above the fixed pulley (403); the movable pulley (404) is slidingly connected to the cover (2); a fixed end of the pull rope (401) bypasses the movable pulley (404) and is connected to the fixed pulley (403); and an upper end of the push rod (407) is connected (Continued)

to the movable pulley (404). These and other embodiments and variations are more fully disclosed herein.

10 Claims, 16 Drawing Sheets

(56) References Cited

FOREIGN PATENT DOCUMENTS

| | | |
|---|---|---|
| CN | 211500452 U | 9/2020 |
| CN | 112431501 A | 3/2021 |
| GB | 579348 A | 7/1946 |

\* cited by examiner

PROTECTIVE APPARATUS AND AERIAL WORK DEVICE

CROSS REFERENCE TO RELATED APPLICATIONS

This application is a U.S. National Phase application under 35 U.S.C. § 371 of International Application No. PCT/CN2021/135277 filed on Dec. 3, 2021 and claims priority to Chinese Application No. 202011423985.0 filed on Dec. 8, 2020.

FIELD OF THE INVENTION

This application relates to the field of engineering machinery and equipment, in particular to a protective apparatus, and also to an aerial work device including the aforementioned protective apparatus.

BACKGROUND OF THE INVENTION

The power, hydraulic, and electrical devices of aerial work device are usually installed in a closed protective apparatus to prevent collisions and rain, as well as to prevent injury to the operator by contact with the equipment.

For the convenience of maintenance, the covers of the protective apparatus can usually be opened and closed. For medium and large aerial work device, the edge of the covers will be in a higher position after the covers is opened, and it is difficult for the operator to touch the covers when standing on the ground. It is necessary to climb to a higher place to close the covers with the help of external objects, which is not only inconvenient to operate, but also has certain safety risks.

Therefore, how to provide a protective apparatus that is convenient for the operator to close the covers is an urgent technical problem for those skill in this art.

SUMMARY OF THE INVENTION

One purpose of the present application is to provide a protective apparatus that can effectively solve the problems such as the inconvenient closing of the covers, and another purpose is to provide an aerial work device that includes the aforementioned protective apparatus.

In order to solve the above technical problems, the present application provides the following technical solutions:

A protective apparatus comprises a bracket and a cover, the upper side of the cover is hinged with the upper side of the bracket, and also comprises a pull-down apparatus, the pull-down apparatus comprises a fixed pulley, a movable pulley, a push rod and a pull rope, the fixed pulley is fixed connected to the cover, the movable pulley is located above the fixed pulley, the movable pulley is sliding connected to the cover, the fixed end of the pull rope bypassing the movable pulley is connected to the fixed pulley, the upper end of the push rod is connected to the movable pulley, the push rod and the movable pulley cause the handle end of the pull rope to hang down under the action of gravity, pull down the handle end of the pull rope to move the cover downwards, after the lower end of the push rod contact the bracket, push the movable pulley upwards to drive the handle end of the pull rope upwards.

Preferably, the pull-down apparatus also comprises a supporting plate, the supporting plate is fixedly connected to the cover, the supporting plate is provided with a chute, the fixed pulley is arranged at the bottom of the supporting plate, the movable pulley is sliding connected to the chute.

Preferably, the supporting plate is fixedly connected to the inner wall of the cover.

Preferably, the upper end of the push rod is hinged with the movable pulley.

Preferably, the bottom of the bracket is provided with a limiting part for opposing the push rod.

Preferably, the upper part of the limiting part and the lower end of the push rod are respectively provided with a cushion block.

Preferably, it also comprises an elastic part, wherein the two ends of the elastic part are respectively connected to the cover and the movable pulley, and the movable pulley moves downward under the action of its gravity and the elastic force of the elastic part; The elastic part undergo compression and deformation after the push rod is pressed against the bracket.

Preferably, the elastic part is a spring, the upper end of the spring is connected to the cover, and the lower end of the spring is connected to the movable pulley.

Preferably, the pull-down apparatus comprises multiple fixed pulleys and multiple movable pulleys, and the pull rope bypasses the fixed pulleys and the movable pulleys in turn.

An aerial work device, comprising a protective apparatus as described in any of the above.

Compared with prior technologies, the above technical solution has the following advantages:

The present application provides a protective apparatus and high altitude operation equipment, comprising bracket and cover, the upper side of the cover and the upper side of the bracket hinged, also comprises a pull-down apparatus, the pull-down apparatus comprises fixed pulley, movable pulley, push rod and pull rope, the fixed pulley is fixed connected to the cover, the movable pulley is located above the fixed pulley, the movable pulley and cover sliding connection, the fixed end of the rope bypassing the movable pulley is connected to the fixed pulley, and the upper end of the push rod is connected to the movable pulley. After the cover is opened from the bracket, the push rod and the movable pulley move downward under the action of gravity to make the handle end of the pull rope hang down, so as to facilitate the operator to pull the handle end; When the cover needs to be closed, pull down the handle end to move the cover down. When the lower end of the push rod contact the bracket, the reverse push movable pulley moves up, which will drive the handle end of the pull rope to move up, so as to play the role of store the pull rope. In addition, the pull-down apparatus is a full mechanical structure, which does not require the use of a electric motor to pull the pull rope, so the structure is simple and easy to maintain.

BRIEF DESCRIPTION OF THE DRAWINGS

In order to more clearly illustrate the technical solution in the present application or in the prior art, a brief description of the drawings required to be used in the embodiments or in the description of the prior art is presented below. It is obvious that the drawings in the description below are embodiments of the present application. For those skilled in the art, other drawings could be obtained based on these drawings, without creative effort.

REFERENCE NUMERALS

1—bracket; 101—limiting part; 2—cover; 3—rotating hinge; 4—pull-down apparatus;
2—401—pull rope; 402—handle end; 403—fixed pulley; 404—movable pulley; 405—supporting plate; 406—chute; 407—push rod; 408—spring.

DETAILED DESCRIPTION OF THE EMBODIMENTS

In order to make the above purposes, characteristics and advantages of the present application more obvious and understandable, the following is a detailed description of the specific implementation of the present application in the accompanying drawings.

Specific details are set out in the following description so that the present application can be fully understood. However, this application may be implemented in a variety of ways other than those described herein, and those skilled in the art may make similar promotions without violating the meaning of this application. This application is therefore not subject to the specific modalities of implementation disclosed below.

Figure 1:
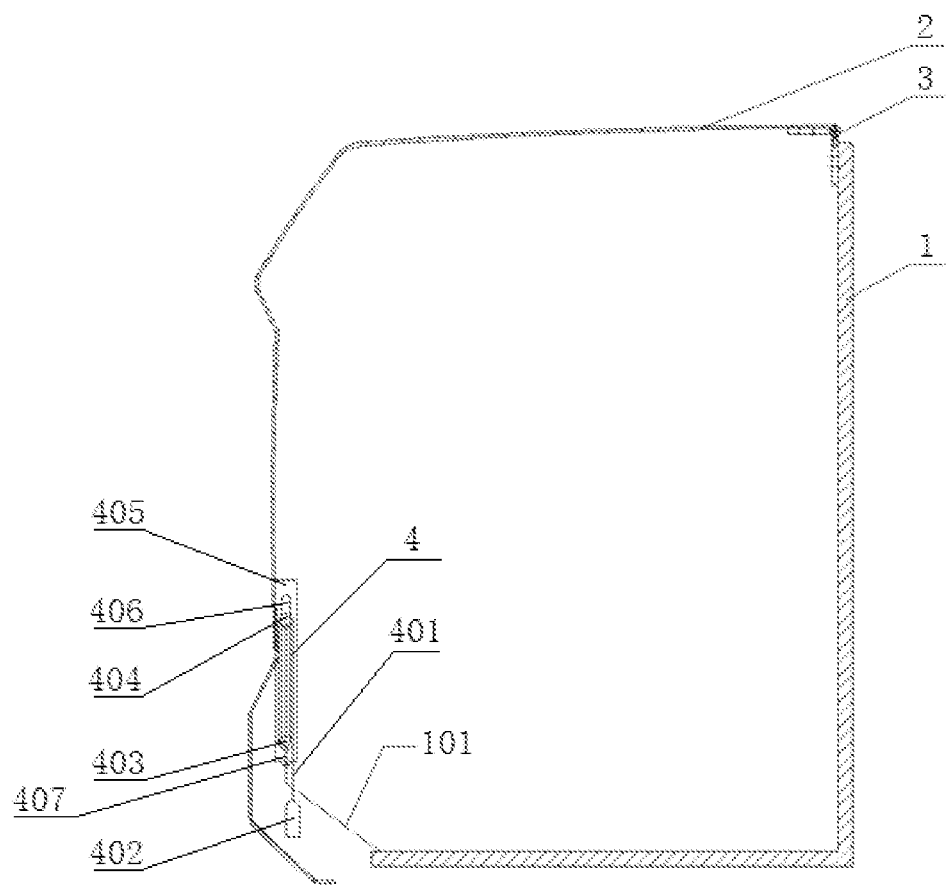
FIG. 1 is a schematic drawing of a protective apparatus according to the first embodiment of the present application when it is in a closed state.
Figure 2:
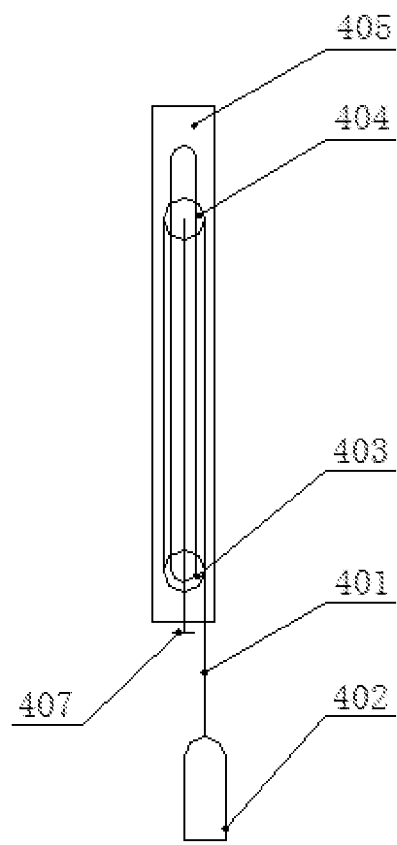
FIG. 2 is a schematic diagram of the structure of the pull-down apparatus in FIG. 1.
Figure 3:
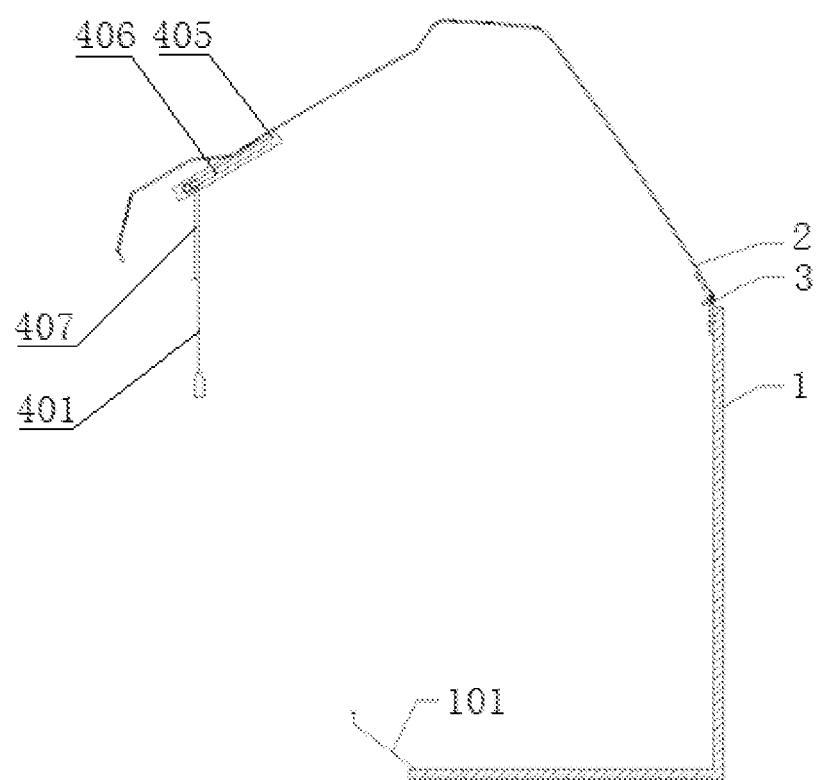
FIG. 3 is a schematic diagram of the structure of the first embodiment of protective apparatus when it is in the open state.
Figure 4:
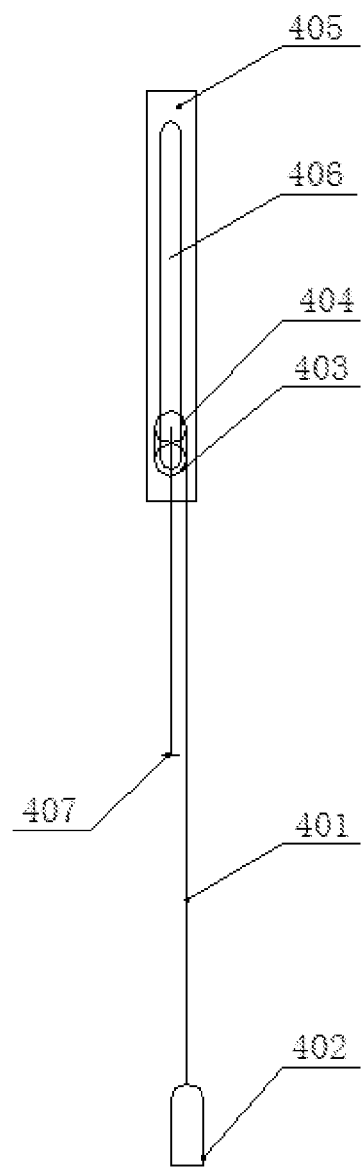
FIG. 4 is a schematic diagram of the structure of the pull-down apparatus in FIG. 3.
Figure 5:
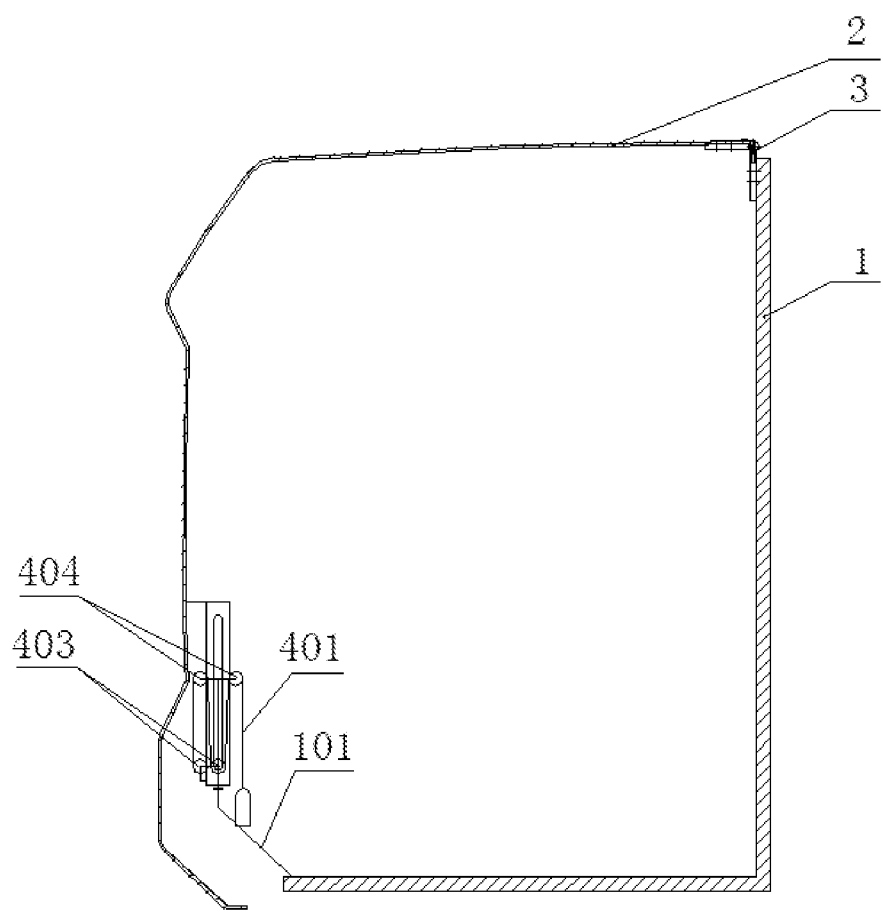
FIG. 5 is a schematic diagram of the structure of the protective apparatus with multiple fixed pulleys and movable pulleys in a closed state.
Figure 6:
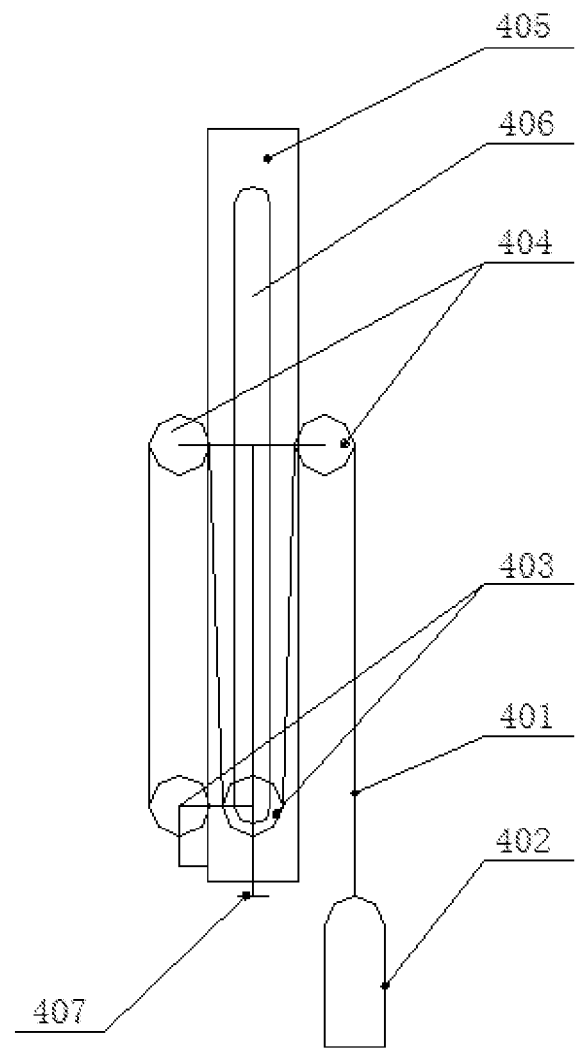
FIG. 6 is a schematic diagram of the structure of the pull-down apparatus in FIG. 5.
Figure 7:
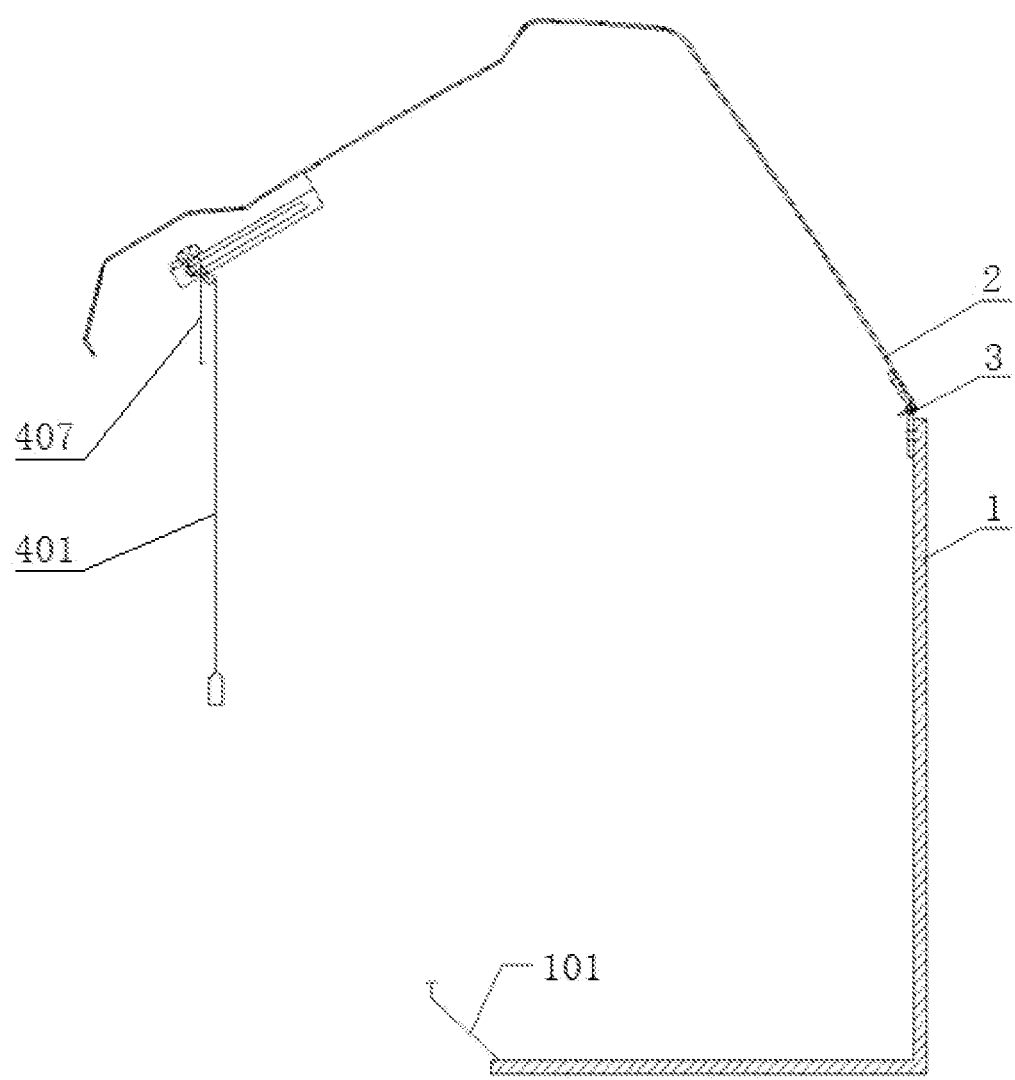
FIG. 7 is a schematic diagram of the structure of the protective apparatus with multiple fixed pulleys and movable pulleys in a open state.
Figure 8:
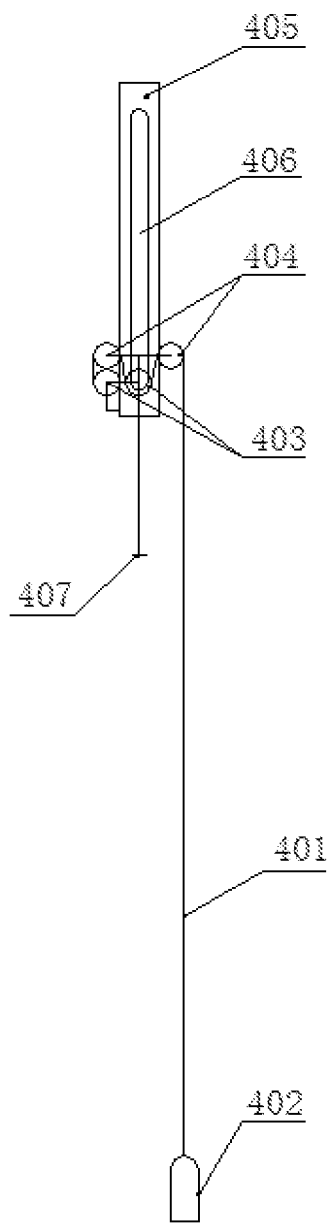
FIG. 8 is a schematic diagram of the structure of the pull-down apparatus in FIG. 7.
Figure 9:
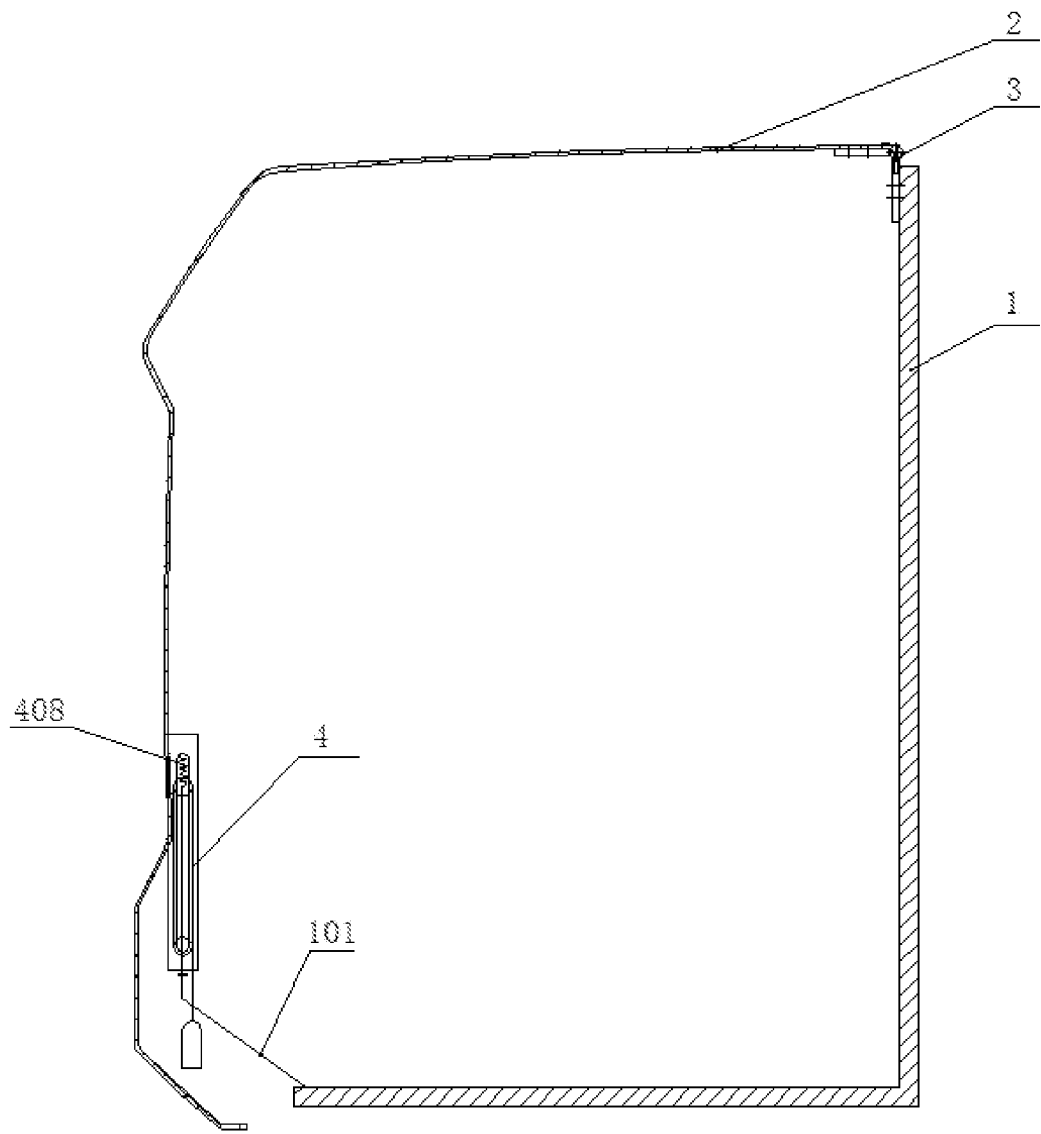
FIG. 9 is a schematic drawing of a protective apparatus according to the second embodiment of the present application when it is in a closed state.
Figure 10:
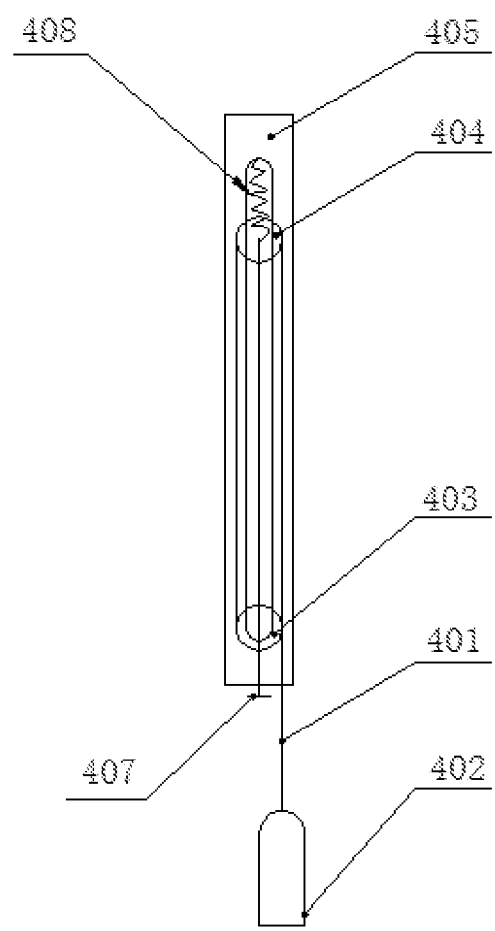
FIG. 10 is a schematic diagram of the structure of the pull-down apparatus in FIG. 9.
Figure 11:
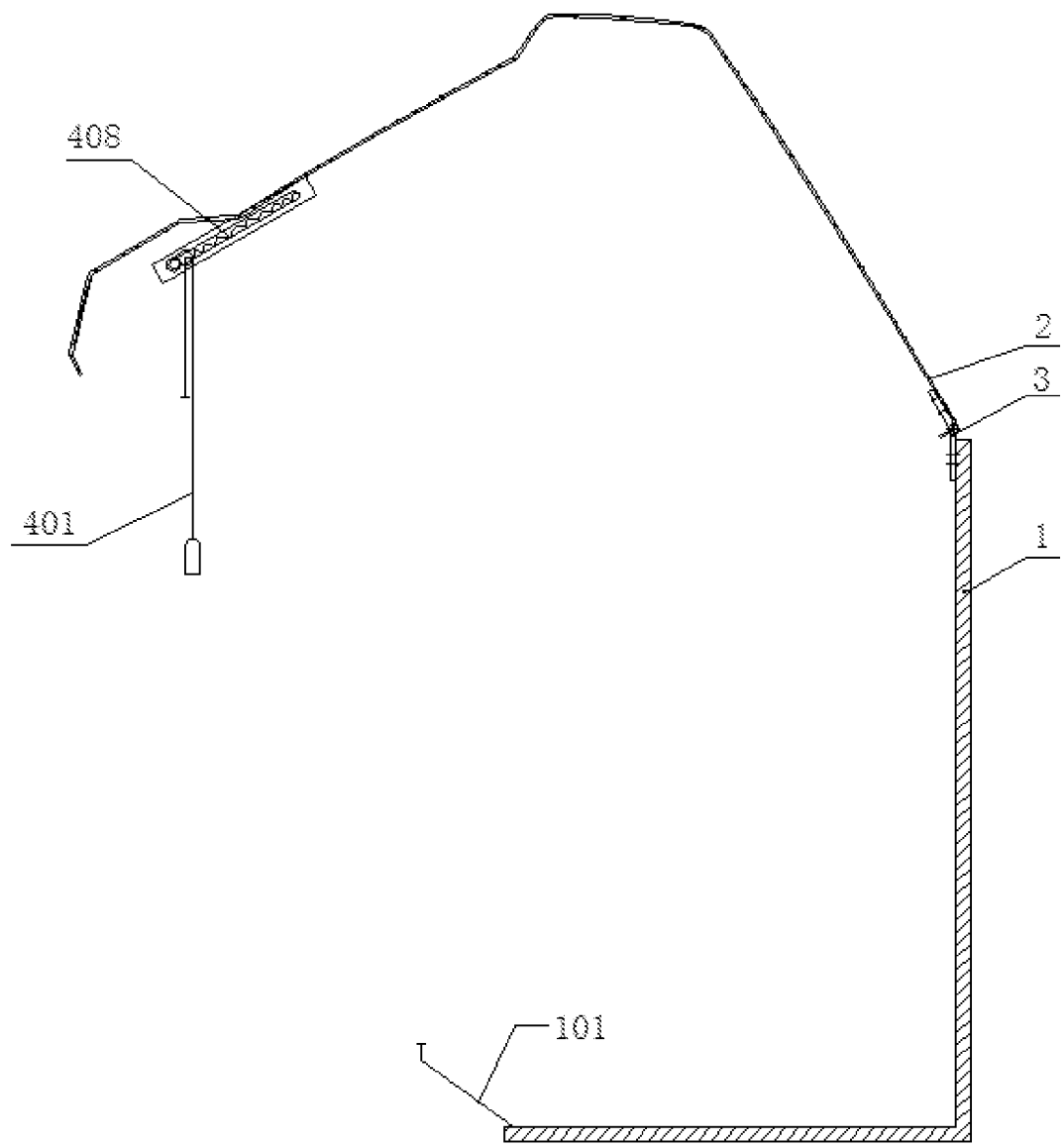
FIG. 11 is a schematic diagram of the structure of the second embodiment of protective apparatus when it is in the open state.
Figure 12:
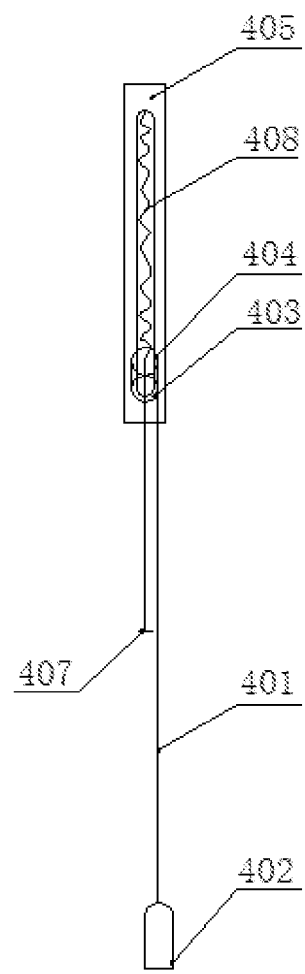
FIG. 12 is a schematic diagram of the structure of the pull-down apparatus in FIG. 11.
Figure 13:
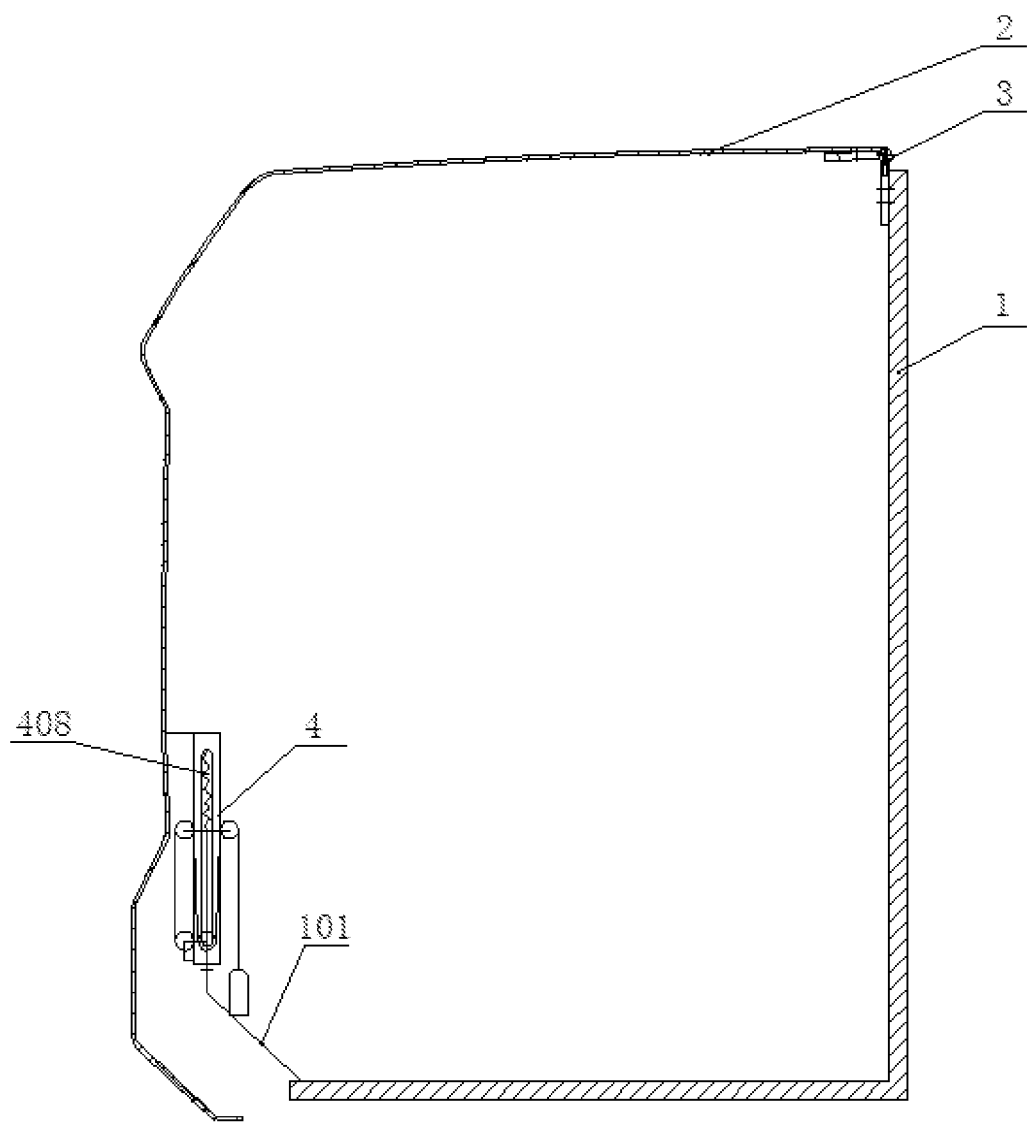
FIG. 13 is a schematic diagram of the structure of the second embodiment of protective apparatus with multiple fixed pulleys and movable pulleys in a closed state.
Figure 14:
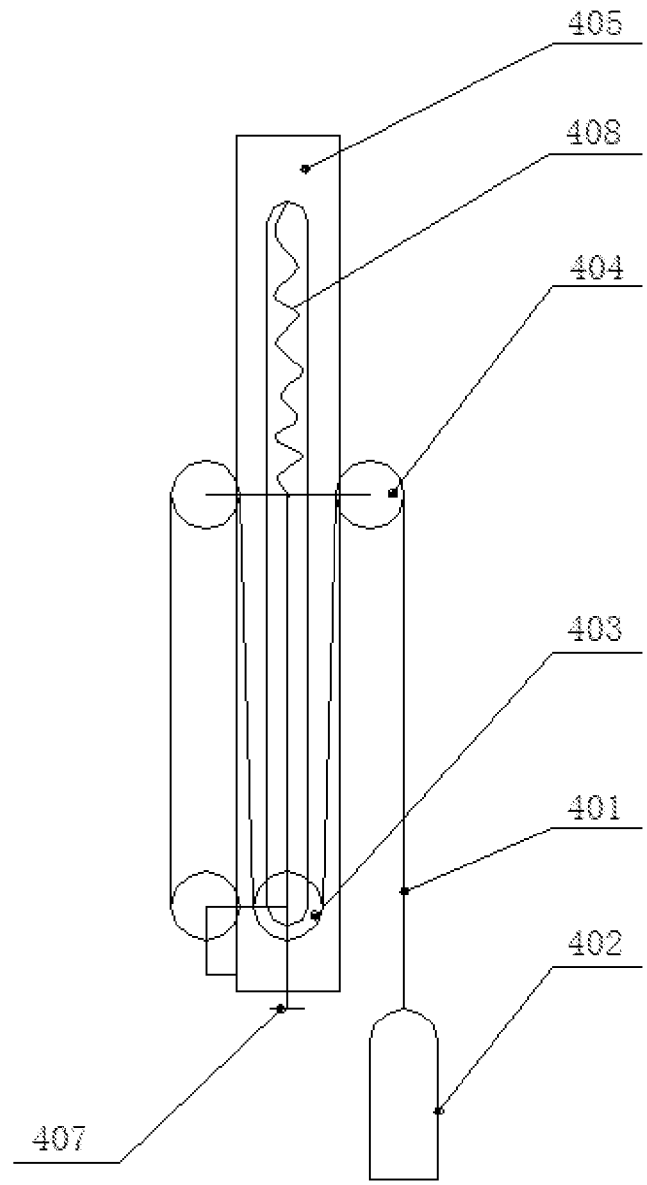
FIG. 14 is a schematic diagram of the structure of the pull-down apparatus in FIG. 13.
Figure 15:
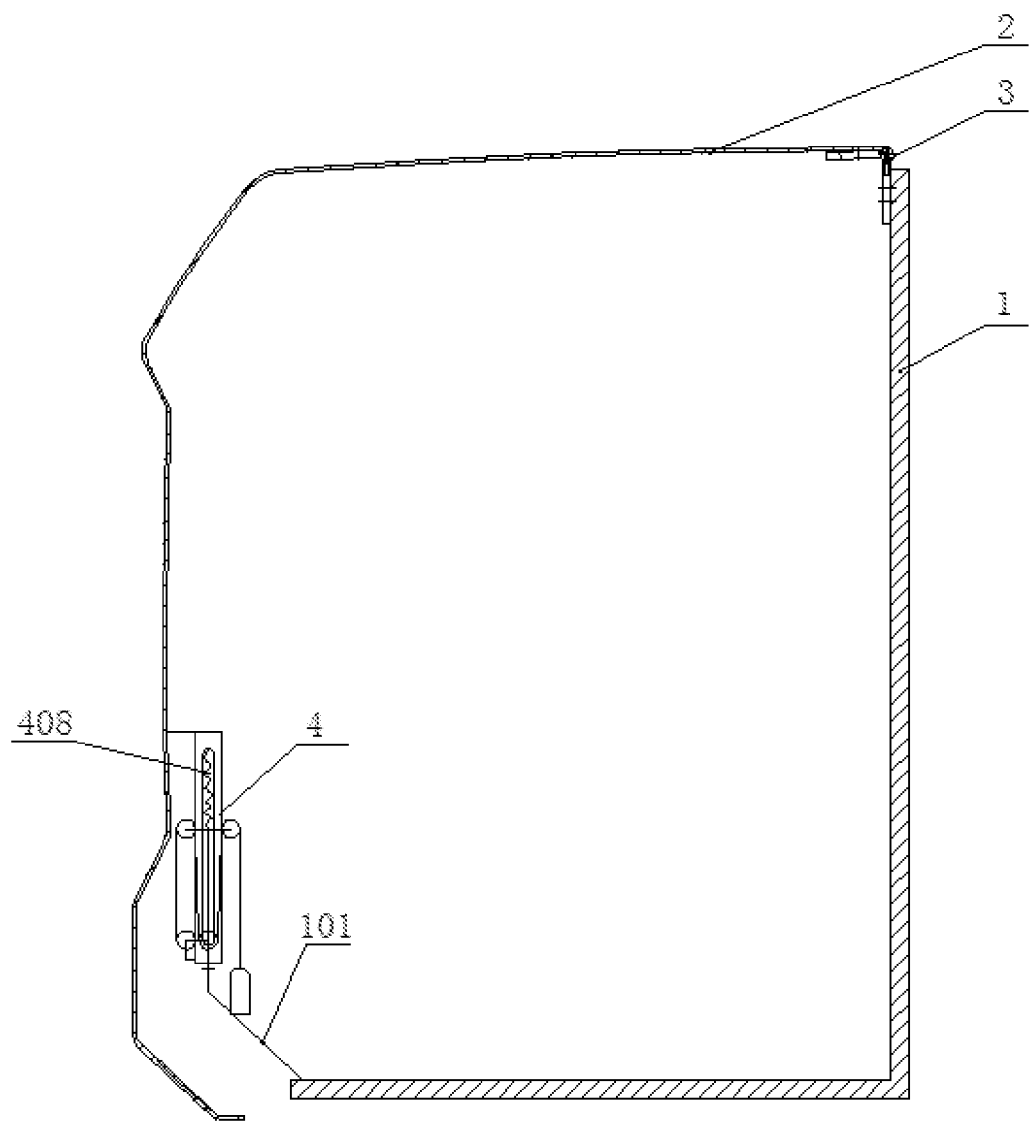
FIG. 15 is a schematic diagram of the structure of the second embodiment of protective apparatus with multiple fixed pulleys and movable pulleys in a open state.
Figure 16:
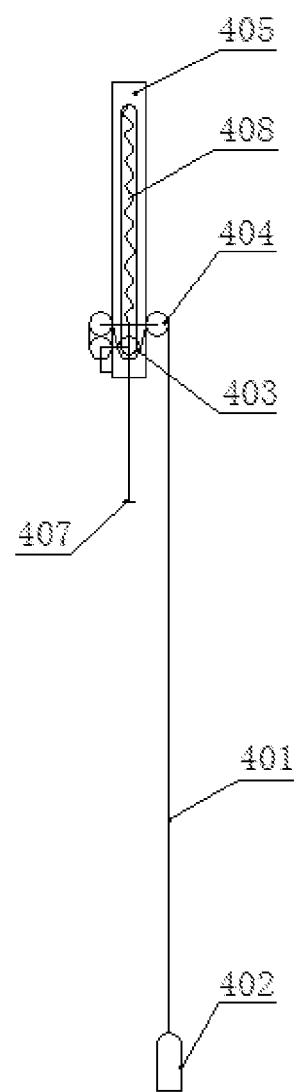
FIG. 16 is a schematic diagram of the structure of the pull-down apparatus in FIG. 15.

Please refer to FIG. 1 to FIG. 4. FIG. 1 is a schematic drawing of a protective apparatus according to the first embodiment of the present application when it is in a closed state; FIG. 2 is a schematic diagram of the structure of the pull-down apparatus in FIG. 1; FIG. 3 is a schematic diagram of the structure of the first embodiment of protective apparatus when it is in the open state; FIG. 4 is a schematic diagram of the structure of the pull-down apparatus in FIG. 3.

A specific implementation of the present application provides a protective apparatus, comprising a bracket 1 and a cover 2, the upper side of the cover 2 and the upper side of the bracket 1 can be hinged by rotating hinge 3, also comprises a pull-down apparatus 4, the pull-down apparatus 4 comprises fixed pulley 403, movable pulley 404, push rod 407 and pull rope 401, the fixed pulley 403 is fixed with the cover part 2, the movable pulley 404 is located above the fixed pulley 403, the movable pulley 404 and the covering piece 2 sliding connection, the fixed end of the pull rope 401 bypass the movable pulley 404 is connected to the fixed pulley 403, the upper end of the push rod 407 is connection with the movable pulley 404.

After the cover 2 is opened from the bracket 1, the push rod 407 and the moving pulley 404 move down under the action of gravity to make the handle end 402 of the pull rope 401 hang down, so as to facilitate the operator to pull the handle end 402; When the cover 2 needs to be closed, pull the handle end 402 downward, and the cover 2 moves down. When the lower end of the push rod 407 contact the bracket 1, the reverse push movable pulley 404 moves up. At this time, the handle end 402 of the pull rope 401 moves up, so as to store the pull rope 401. In addition, the pull-down apparatus 4 is a full mechanical structure, which does not require the use of a electric motor to pull the pull rope 401, so the structure is simple and easy to maintain.

Further, the pull-down apparatus 4 also comprises a supporting plate 405, wherein the supporting plate 405 is preferably located on the inner side of the cover 2. Therefore, after closing the cover 2, the pull-down apparatus 4 could be located inside the protective apparatus to protect the pull-down apparatus 4. In addition, the supporting plate 405 is fixed connected to the inner wall of the cover 2, for example, it could be connected by welding or fasteners, the supporting plate 405 is provided with a chute 406, the fixed pulley 403 is arranged at the bottom of the supporting plate 405, the movable pulley 404 and chute 406 sliding connection, wherein the supporting plate 405 is preferably arranged vertically in the inner side of the slat of the cover 2, the chute 406 extends along the length direction of the corresponding slat.

In order to facilitate the push rod 407 drive the movable pulley 404 move down and the lower end of the push rod 407 contact with bracket 1, the upper end of the push rod 407 is hinged with the movable pulley 404, that is, the push rod 407 could always be in the vertical state after the cover 2 is opened.

In addition, in order to facilitate the contact between the push rod 407 and bracket 1, a limiting part 101 is provided at the bottom of the bracket 1 to lean against the push rod 407. Secondly, in order to improve the supporting ability of the limiting part 101 to push rod 407, the upper part of the limiting part 101 and the lower end of the push rod 407 are respectively provided with a cushion block.

Please refer to FIG. 9 to FIG. 12, which also comprises the elastic part, wherein both ends of the elastic part are connected to the cover 2 and the movable pulley 404 respectively. After opening the cover 2, the movable pulley 404 moves downward under the combined action of its gravity and the elastic force of the elastic part to ensure that the handle end 402 of the pull rope 401 hangs down; When the cover 2 needs to be closed, pull down the pull rope 401, and the cover 2 moves down. The elastic part compresses and deforms after pushing rod 407 press against bracket 1, so that when the cover 2 is opened again, the movable pulley 404 and pushing rod 407 are pushed down through the elastic action of the elastic part. Specifically, the elastic part is preferred to spring 408, the upper end of the spring 408 is connected to the cover 2, and the lower end of the spring 408 is connected to the movable pulley 404.

Please refer to FIG. 5-8 and FIG. 13-16. In this embodiment, the pull-down apparatus 4 comprises multiple fixed pulleys 403 and multiple movable pulleys 404, and the pull rope 401 sequentially bypasses the movable pulleys 404 and 403. By using multiple fixed pulleys 403 and multiple movable pulleys 404, the ratio of the length of the pull rope 401 to the rising height of the push rod 407 would be increased. For example, when a fixed pulley 403 and a movable pulley 404 are provided, the ratio of the length of rope 401 to the rising height of the push rod 407 is 2:1. For example, when two fixed pulleys 403 and two movable pulleys 404 are provided, the ratio of the length of rope 401 to the rising height of the push rod 407 is 4:1.

The present application embodiment also provides an aerial work device, comprising the protective apparatus provided in any of the above embodiments, bracket 1 could be a turntable side plate and a turntable tray. The beneficial effect of the aerial work device could be referred to the above protective apparatus, which would not be described here.

It should be noted that in this application, the terms such as "comprises", "includes" or any other variation thereof are intended to cover non-exclusive inclusion so that a process, method, item or device that includes a series of elements not only includes those elements, but also other elements that are not explicitly listed, or also include elements inherent to such a process, method, item, or device. Without further limitations, the elements limited by the statement "including a . . . " do not exclude the existence of other identical elements in the process, method, item, or equipment that includes the said elements.

The above explanation of the disclosed embodiments enables the implementation or use of the present application by those skilled in the art. The variety of modifications to these embodiments would be obvious to those skilled in the art and the general principles defined herein may be implemented in other embodiments without leaving the spirit or scope of the present application. Therefore, the present application would not be limited to these embodiments shown herein, but would conform to the widest scope consistent with the principles and novel features disclosed herein.

The invention claimed is:

1. A protective apparatus, comprising a bracket and a cover, the upper side of the cover is hinged with the upper side of the bracket, wherein the protective apparatus comprises a pull-down apparatus, the pull-down apparatus comprises a fixed pulley, a movable pulley, a push rod and a pull rope, the fixed pulley is fixed connected to the cover, the movable pulley is located above the fixed pulley, the movable pulley is sliding connected to the cover, the fixed end of the pull rope bypassing the movable pulley is connected to the fixed pulley, the upper end of the push rod is connected to the movable pulley , and the push rod and the movable pulley cause the handle end of the pull rope to hang down under the action of gravity, pull down the handle end of the pull rope to move the cover downwards, after the lower end of the push rod contact the bracket , and push the movable pulley upwards to drive the handle end of the pull rope upwards.

2. The protective apparatus according to claim 1, wherein the pull-down apparatus also comprises a supporting plate , the supporting plate is fixedly connected to the cover, the supporting plate is provided with a chute, the fixed pulley is arranged at the bottom of the supporting plate, the movable pulley is sliding connected to the chute.

3. The protective apparatus according to claim 2, wherein the supporting plate is fixedly connected to the inner wall of the cover.

4. The protective apparatus according to claim 1, wherein the upper end of the push rod is hinged with the movable pulley.

5. The protective apparatus according to claim 1, wherein the bottom of the bracket is provided with a limiting part for leaning against the push rod.

6. The protective apparatus according to claim 5, wherein the upper part of the limiting part and the lower end of the push rod are respectively provided with a cushion block.

7. The protective apparatus according to claim 1, wherein the protective apparatus comprises an elastic part, wherein the two ends of the elastic part are respectively connected to the cover and the movable pulley, and the movable pulley moves downward under the action of its gravity and the elastic force of the elastic part; and the elastic part undergoes compression and deformation after the push rod is pressed against the bracket.

8. The protective apparatus according to claim 7, wherein the elastic part is a spring, the upper end of the spring is connected to the cover, and the lower end of the spring is connected to the movable pulley.

9. The protective apparatus according to claim 1, wherein the pull-down apparatus comprises multiple fixed pulleys and multiple movable pulleys, and the pull rope bypasses the fixed pulleys and the movable pulleys in turn.

10. An aerial work device comprising the protective apparatus according to claim 1.

* * * * *